US011469848B2

(12) United States Patent
Kim et al.

(10) Patent No.: US 11,469,848 B2
(45) Date of Patent: Oct. 11, 2022

(54) MULTI-CHANNEL OPTICAL PHASE DETECTOR, MULTI-CHANNEL SENSING SYSTEM AND MULTI-LASER SYNCHRONIZATION SYSTEM

(71) Applicant: KOREA ADVANCED INSTITUTE OF SCIENCE AND TECHNOLOGY, Daejeon (KR)

(72) Inventors: Jungwon Kim, Daejeon (KR); Chan-Gi Jeon, Daejeon (KR); Yongjin Na, Daejeon (KR); Dohyeon Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 365 days.

(21) Appl. No.: 16/784,369

(22) Filed: Feb. 7, 2020

(65) Prior Publication Data
US 2020/0266913 A1  Aug. 20, 2020

(30) Foreign Application Priority Data
Feb. 15, 2019 (KR) .......................... 10-2019-0018205

(51) Int. Cl.
*H04B 10/00* (2013.01)
*H04J 14/02* (2006.01)
(Continued)

(52) U.S. Cl.
CPC ............. *H04J 14/0221* (2013.01); *G01J 9/02* (2013.01); *H04B 10/508* (2013.01); *H04B 10/5051* (2013.01); *G01J 2009/0288* (2013.01)

(58) Field of Classification Search
CPC .... H04J 14/02; H04J 14/0221; H04B 10/508; H04B 10/5051; H04B 10/506; G01J 9/02;
(Continued)

(56) References Cited

U.S. PATENT DOCUMENTS 5,929,990 A * 7/1999 Hall ...................... G01L 9/0079
356/519
9,759,585 B2 9/2017 Holland et al.

FOREIGN PATENT DOCUMENTS

KR 10-1331980 11/2013
KR 10-1687118 12/2016
(Continued)

OTHER PUBLICATIONS

EPO, partial European Search Report of EP 20157355.7 dated Jul. 15, 2020.
(Continued)

*Primary Examiner* — Hanh Phan
(74) *Attorney, Agent, or Firm* — Lex IP Meister, PLLC

(57) ABSTRACT

A multi-channel sensing system is disclosed. The multi-channel sensing system includes a multi-channel sensor connector that wavelength-divides an optical pulse output from a pulsed laser into a plurality of channels in a spectrum domain, transmits each of a plurality of optical sub-pulses generated from the wavelength division to a channel path allocated for each channel in multi-channel paths, multiplexes the plurality of optical sub-pulses passed through the multi-channel paths and outputs an optical signal including the multiplexed optical sub-pulses; and a multi-channel optical phase detector that receives the optical signal output from the multi-channel connector and a reference signal which is synchronized to the pulse laser, and detects a channel-specific electrical signal that corresponds to a timing error between each of the plurality of optical sub-pulses included in the optical signal and the reference signal. At lease one of sensors is connected to at least one of the multi-channel paths.

16 Claims, 10 Drawing Sheets

(51) Int. Cl.
*G01J 9/02* (2006.01)
*H04B 10/50* (2013.01)
*H04B 10/508* (2013.01)

(58) Field of Classification Search
CPC ...... G01S 7/4865; G01S 7/489; G01S 7/4861;
G01S 7/484; H04L 7/0075
USPC ... 398/79, 158, 159, 154, 155, 161, 162, 33,
398/182, 183, 135, 136, 25, 202, 208,
398/209, 195, 196, 197, 198; 356/5.01,
356/73.1
See application file for complete search history.

(56) References Cited

FOREIGN PATENT DOCUMENTS

| | | |
|---|---|---|
| KR | 10-1856882 | 5/2018 |
| KR | 10-1866691 | 6/2018 |

OTHER PUBLICATIONS

Xing. Lu et al., "Ultrasensitive, high-dynamic-range and broadband strain sensing by time-of-flight detection with femtosecond-laser frequency combs." Sci. Rep. 7, 1~6 (2017).

Kadambi and R. Raskar. "Rethinking Machine Vision Time of Flight With GHz Heterodyning." IEEE Access 5, 26211~26223 (2017).

J. Chen, Q. Liu, X. Fan & Z. He, "Ultrahigh resolution optical fiber strain sensor using dual Pound-Drever-Hall feedback loops." Opt. Lett. 41, 1066~1069 (2016).

\* cited by examiner

MULTI-CHANNEL OPTICAL PHASE DETECTOR, MULTI-CHANNEL SENSING SYSTEM AND MULTI-LASER SYNCHRONIZATION SYSTEM

CROSS-REFERENCE TO RELATED APPLICATION

This application claims priority to and the benefit of Korean Patent Application No. 10-2019-0018205 filed in the Korean Intellectual Property Office on Feb. 15, 2019.

BACKGROUND

(a) Field

The present disclosure relates to a physical quantity measurement method using a time-of-flight (TOF) of an optical pulse.

(b) Description of the Related Art

Measuring time-of-flight (TOF) of optical pulse train is used to acquire a physical quantity (e.g., a distance) of a measurement target object and to image the measurement target object. Such sensing and imaging technologies are important foundation technologies of the fourth industrial revolution. A TOF-based sensor is traditionally used in distance measurement and imaging, and is used in RADAR, LiDAR (Light Detection and Ranging), ultrasonic detection, and the like.

However, measuring distance with time-of-flight has a limitation in that it has compromised performance between a measurement range and resolution. For example, an interferometer-based measurement enables ultra-high resolution measurements of tens of picoseconds to nanoseconds in a carrier frequency region, while a non-ambiguity range that is distinguishable becomes very narrow. Meanwhile, a pulse signal-based measurement allows broadband measurements at a meter level but with limited resolution.

In addition, conventional sensing systems can measure time-of-flight of a single sensor, and a plurality of sensing systems should be constructed to measure the time-of-flight of a plurality of sensors. Therefore, the system for measuring the time-of-flight of a plurality of sensors is complicated, and cost is increased.

The above information disclosed in this Background section is only for enhancement of understanding of the background of the invention and therefore it may contain information that does not form the prior art that is already known in this country to a person of ordinary skill in the art.

SUMMARY

The present disclosure may provide a multi-channel sensing system that generates optical sub-pulses having different wavelengths by wavelength-dividing an optical pulse. The present disclosure may provide a multi-channel sensing system that measures time-of-flight of optical sub-pulses passed through a plurality of channel paths connected with sensors at once.

In addition, the present disclosure may provide a system that synchronizes a plurality of lasers through a multi-channel optical phase detector.

Some embodiments of the present disclosure provide a multi-channel sensing system. The multi-channel sensing system may include a multi-channel sensor connector that wavelength-divides an optical pulse output from a pulsed laser into a plurality of channels in a spectrum domain, transmits each of a plurality of optical sub-pulses generated from the wavelength division to a channel path allocated for each channel in multi-channel paths, multiplexes the plurality of optical sub-pulses passed through the multi-channel paths and outputs an optical signal including the multiplexed optical sub-pulses; and a multi-channel optical phase detector that receives the optical signal output from the multi-channel connector and a reference signal which is synchronized to the pulse laser, and detects a channel-specific electrical signal that corresponds to a timing error between each of the plurality of optical sub-pulses included in the optical signal and the reference signal. At lease one of sensors may be connected to at least one of the multi-channel paths.

The multi-channel connector may include a demultiplexer that generates the plurality of sub-pulses corresponding to the plurality of channels from the optical pulse output from the pulsed laser based on wavelength division multiplexing; the multi-channel paths through which the plurality of sub-pulses pass; and a multiplexer that multiplexes the plurality of optical sub-pulses passed through the multi-channel paths.

The multi-channel optical phase detector may include an error detector that receives the optical signal including the multiplexed plurality of optical sub-pulses, and outputs a first optical signal and a second optical signal that include timing error information between the optical signal received and the reference signal; a first demultiplexer that wavelength-divides the first optical signal into the plurality of channels; a second demultiplexer that wavelength-divides the second optical signal into the plurality of channels; and a plurality of balanced photodetectors that respectively correspond to the plurality of channels. Each of the balanced photodetectors may receive two optical signals output from each channel of the first demultiplexer and the second demultiplexer, and outputs an electrical signal that corresponds to an intensity difference between the two optical signals.

The error detector may be implemented by using a fiber loop-based optical-microwave phase detector (FLOM-PD), a 3×3 coupler-based phase detector, a balanced optical-microwave phase detector (BOM-PD, or a biased Mach-Zehnder interferometer-based phase detector).

The multi-channel optical phase detector may transmit an electrical signal detected in a reference channel among the detected channel-specific electrical signals to an RF signal source, as a synchronization signal of the RF signal source. The RF signal source may compensate an error with respect to the pulsed laser based on the synchronization signal fed back from the multi-channel optical phase detector, and outputs the reference signal synchronized to the pulsed laser.

The multi-channel sensing system may further include an RF signal source that outputs a microwave signal; and an optical phase detector for synchronization that detects an electrical signal corresponding to an error between another optical pulses output from the pulsed laser and the microwave signal, and transmits the detected electrical signal to the RF signal source, as a synchronization signal of the RF signal source. The RF signal source may compensate an error with respect to the pulsed laser based on the synchronization signal fed back from the optical phase detector for synchronization, and outputs the reference signal synchronized to the pulsed laser.

A plurality of sensors may be connected in parallel on the multi-channel paths, and a channel-specific electrical signal is converted into a measured physical quantity of a corresponding sensor connected to the corresponding channel path.

The multi-channel optical phase detector may be disposed in a plurality of nodes on an optical fiber that connects the pulsed laser and the multi-channel optical phase detector. The multi-channel optical phase detector may receive an optical signal including a plurality of optical sub-pulses passed through the plurality of nodes.

Some embodiments of the present disclosure provide a multi-laser synchronization system. The multi-laser synchronization system may include an RF signal source that generates a reference signal; a multiplexer that receives a plurality of optical sub-pulses with different wavelengths designated to a plurality of lasers, wherein the plurality of optical sub-pulses are individually extracted from the plurality of lasers according to designated wavelengths, multiplexes the plurality of optical sub-pulses and outputs an optical signal including the multiplexed optical sub-pulses; and a multi-channel optical phase detector that receives the optical signal output from the multiplexer and the reference signal, detects an electrical signal for each laser corresponding to a timing error between each of the plurality of optical sub-pulses and the reference signal, and transmits the detected electrical signal for each laser to the corresponding laser for compensating the timing error of the corresponding laser.

The multi-channel optical phase detector may include an error detector that receives the optical signal including the multiplexed plurality of optical sub-pulses, and outputs a first optical signal and a second optical signal including timing error information between the optical signal received and the reference signal; a first demultiplexer that wavelength-divides the first optical signal into a plurality of channels respectively designated to the plurality of lasers; a second demultiplexer that wavelength-divides the second optical signal into the plurality of channels; and a plurality of balanced photodetectors that output a timing error of each of the plurality of lasers as an electrical signal. Each of the balanced photodetector may receive two optical signals output from each channel of the first demultiplexer and the second demultiplexer, and outputs an electrical signal that corresponds to an intensity difference between two optical signals.

The error detector may be implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

Some embodiments of the present disclosure provide a multi-frequency channel sensing system. The multi-frequency channel sensing system may include an RF signal source that generates a reference signal; an error detector that receives an optical signal including multiplexed optical sub-pulses with different wavelengths, and outputs a first optical signal and a second optical signal including timing error information between the optical signal received and the reference signal; a first demultiplexer that wavelength-divides the first optical signal into a plurality of channels; a second demultiplexer that wavelength-divides the second optical signal into the plurality of channels; and a plurality of balanced photodetectors that respectively correspond to the plurality of channels, receive two optical signals output for each channel from each of the first demultiplexer and the second demultiplexer, and output electrical signals respectively that correspond to intensity differences of the two optical signals received in each channel.

The multi-channel sensing system may further include a multi-channel sensor connector that generates the optical sub-pulses by wavelength-dividing an optical pulse output from a pulsed laser into the plurality of channels, transmits the optical sub-pulses to channel paths allocated for each channel in multi-channel paths, multiplexes the plurality of optical sub-pulses passed through the multi-channel paths and outputs the optical signal including the multiplexed optical sub-pulses. The optical signal output from the multi-channel connector may be transmitted to the error detector. At least one of sensors may be connected to at least one of the multi-channel paths.

An electrical signal output from each of the balanced photodetector may correspond to time-of-flight of an optical sub-pulse corresponding channel.

The multi-channel sensing system may further include a multiplexer that receives the optical sub-pulses with different wavelengths designated to a plurality of lasers, wherein the optical sub-pulses are individually extracted from the plurality of lasers according to designated wavelengths, multiplexes the optical sub-pulses and outputs the optical signal multiplexed with optical sub-pulses. The optical signal from the multiplexer may be transmitted to the error detector.

An electrical signal output from each of the balanced photodetectors may be transmitted to a corresponding laser. Each of the plurality of lasers may compensate an error with the RF signal source based on the electrical signal fed back from the corresponding balanced photodetector, and outputs optical pulses synchronized to the RF signal source.

According to the exemplary embodiments, wavelength division can be used to generate multi-frequency channel paths and a time-of-flight error (timing error) of each sensor connected to each frequency channel path can be measured at once.

According to the exemplary embodiments, the reference signal can be synchronized based on a timing error of an optical sub-pulse transmitted in a specific wavelength frequency channel, so that a single optical phase detector can perform not only reference signal synchronization but also multi-frequency channel timing error detection.

According to the exemplary embodiments, the ultra-short laser light source of less than picoseconds can be used to perform multi-frequency channel measurement without performance deterioration, and to provide high resolution and a wide measurement range.

In addition, according to the exemplary embodiments, a plurality of lasers can be simultaneously synchronized to one reference signal by using a multi-frequency channel optical phase detector.

DETAILED DESCRIPTION OF THE EMBODIMENTS

Figure 1:
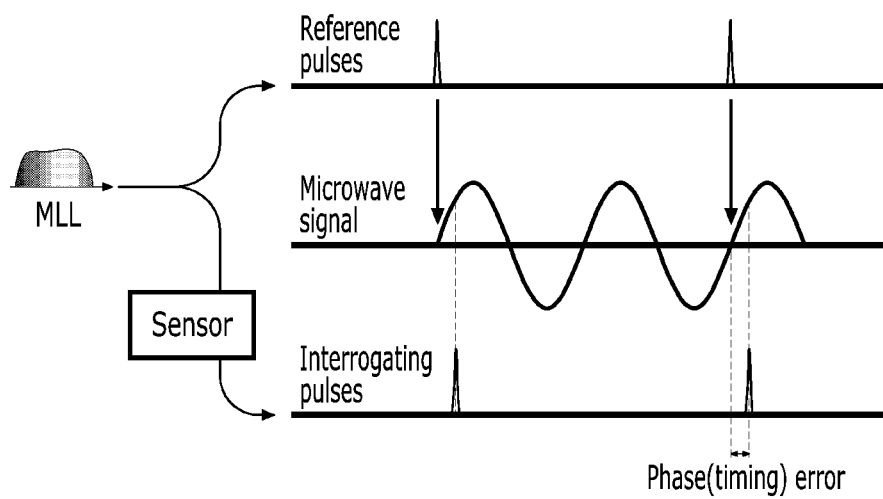
FIG. 1 shows a method for detecting a time-of-flight of an optical pulse.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In the entire specification, phase error, timing error, and time-of-flight may be used interchangeably. A sensor may include a sensor head, a device connected to a measurement target object, or a device including a measurement target object. The present disclosure also includes methods provided by sensing systems according to some embodiments, but the methods are not shown in Figures.

An optical pulse is divided into narrow bandwidths (channels) in the spectral domain to become optical sub-pulses. Each of the optical sub-pulses may pass through a designated channel path. A sub-pulse having a particular wavelength may be referred to as an optical wavelength pulse divided with the particular wavelength. In the entire specification, a sub-pulse, an optical sub-pulse, and an optical wavelength pulse may be used interchangeably.

FIG. 1 shows a method for detecting a time-of-flight of an optical pulse.

Referring to FIG. 1, a time-of-flight of optical pulses is detected by using a synchronized reference signal. The reference signal may be a microwave signal generated from a voltage controlled oscillator (VCO) synchronized to the reference pulses of a laser.

Interrogating pulses reflecting TOF occur phase (timing) error (difference) with the synchronized microwave signal. The phase errors of optical pulses and the microwave signal are measured using a phase detector.

Figure 2:
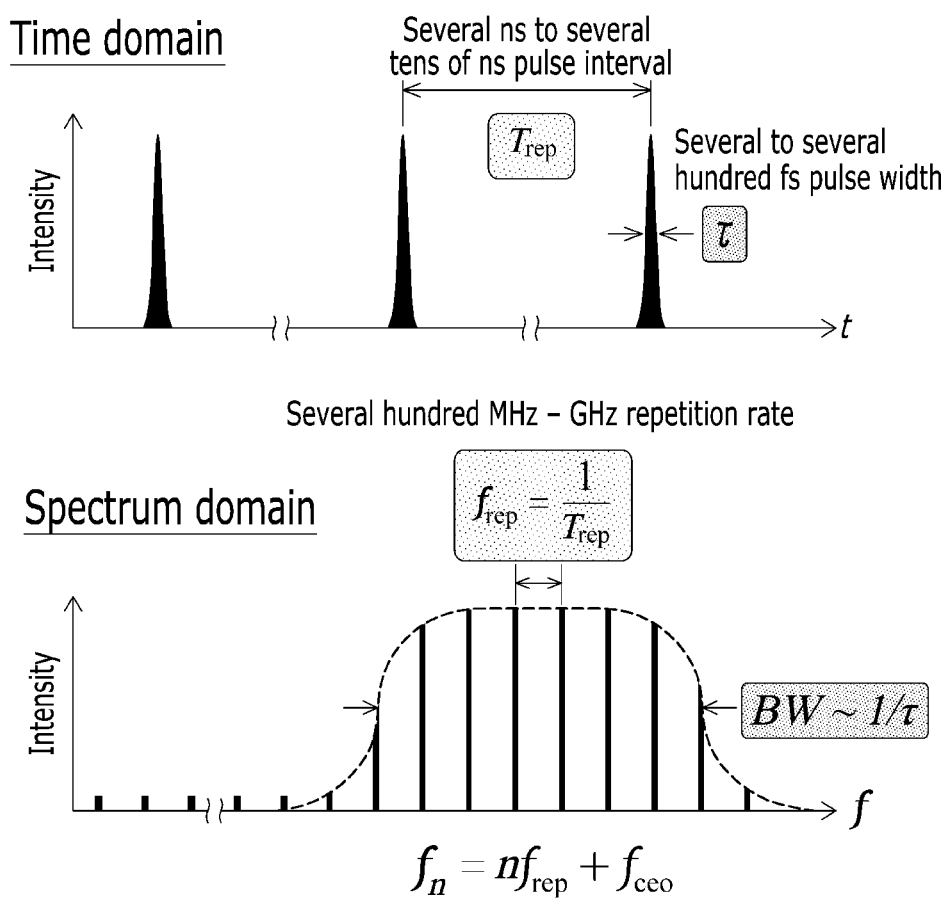
FIG. 2 shows characteristics of femtosecond mode-locked lasers in a time domain and a spectrum domain.

FIG. 2 shows characteristics of femtosecond mode-locked lasers in a time domain and a spectrum domain.

Referring to FIG. 2, femtosecond mode-locked laser (MLL) among pulse lasers has excellent time resolution with a very short pulse width t and a low timing jitter. In addition, the femtosecond mode-locked laser may generate multiple channels by wavelength-dividing a broad spectrum. When pulses of which a time interval (cycle) $T_{rep}$ between pulses is several nanoseconds to several tens of nanoseconds are output, a repetition rate $f_{rep}$, which is a reciprocal of the cycle, becomes several hundred megahertz to several gigahertz.

According to some embodiments of the present disclosure, an optical pulse is wavelength-divided into narrow bandwidths in the spectral domain to become optical sub-pulses. The sub-pulse may be referred to the optical wavelength pulse in the description. The narrow bandwidths may correspond to frequency channels, simply referred to as channels. The optical sub-pulse having a specific wavelength component may pass through a designated channel path.

Figure 3:
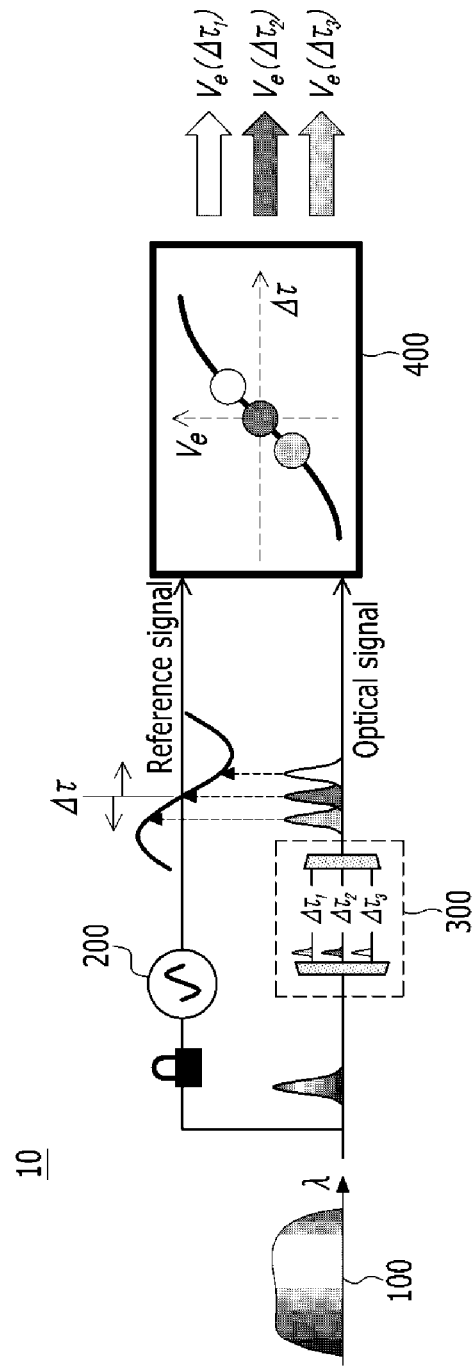
FIG. 3 is a schematic diagram of a multi-channel sensing system according to the exemplary embodiment.
Figure 4:
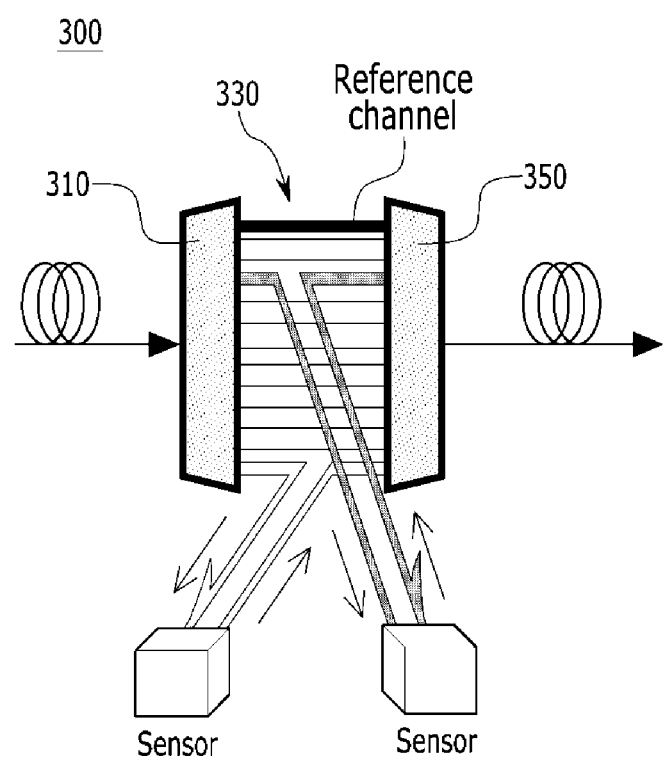
FIG. 4 is a configuration diagram of a multi-channel sensor connector according to the exemplary embodiment.

FIG. 3 is a schematic diagram of a multi-channel sensing system according to the exemplary embodiment, and FIG. 4 is a configuration diagram of a multi-channel sensor connector according to the exemplary embodiment.

Referring to FIG. 3, a multi-channel sensing system 10 includes a pulsed laser 100, an RF signal source 200, at least one multi-channel connector 300, and a multi-channel optical phase detector 400. The multi-channel sensing system 10 may further include a computing device (not shown) that converts a channel-specific output signal of the multi-channel optical phase detector 400 to a measured physical quantity of the corresponding sensor.

The pulsed laser 100 periodically outputs optical pulses. The pulsed laser 100 may be a mode-locked laser (MLL). The pulsed laser 100 may be a femtosecond laser which generates very short optical pulses of a femtosecond scale, but the type of laser is not limited and may be changed to other type of laser.

The RF signal source 200 outputs a reference signal that is synchronized with optical pulses of the pulsed laser 100. A frequency $f_o$ of the reference signal may be an integer multiple of the repetition rate ($n*f_{rep}$). Resolution of the multi-channel optical phase detector can be increased by increasing the frequency of the reference signal.

When the RF signal source 200 is an independent external signal source, a phase of the RF signal source 200 needs to be synchronized with the repetition rate of the pulsed laser 100. As previously described with reference to FIG. 1, a circuit that synchronizes zero crossing of a microwave signal with optical pulses of the pulse layer 100 may be variously designed. According to an exemplary embodiment, the RF signal source 200 may receive a feedback signal including error information, from an additional synchronization phase detector. The RF signal source 200 may compensate the phase difference (timing error) between optical pulses of the pulsed laser 100 and the microwave signal based on the feedback signal, and generate the microwave signal synchronized with the pulsed laser 100. According to another exemplary embodiment, the RF signal source 200 may receive a feedback signal output from a reference channel designated in the multi-channel optical phase detector 400. The RF signal source 200 may compensate the phase difference (timing error) between optical pulses of the pulsed laser 100 and the microwave signal based on the feedback signal, and generate the microwave signal synchronized with the pulsed laser 100.

The RF signal source 200 is a signal generator for constantly generating a waveform, and various kinds of signal sources for generating a signal synchronized with the repetition rate of the pulsed laser 100 may be used. For example, the RF signal source 200 may include a voltage controlled oscillator (VCO) that generates microwave signal, or a photodiode that generates electrical pulses which are photocurrent pulses. Although the VCO is described as an example of the RF signal source 200, the RF signal source 200 is not limited to the VCO, and the reference signal is described as a sinusoidal waveform (a sine wave), but the waveform of the reference signal is not limited to the sine wave.

At least one of the multi-channel connectors 300 is disposed on an optical path that connects the pulsed laser 100 and the multi-channel optical phase detector 400. The multi-channel connector 300 wavelength-divides optical pulses output from the pulsed laser 100 to the corresponding channel, and transmits optical sub-pulses passed through the channel paths to the multi-channel optical phase detector 400 through a single fiber. In this case, since an optical sub-pulse of each channel passes through a different channel path, timing errors ($\Delta\tau1$, $\Delta\tau2$, $\Delta\tau3$) are different from each other with respect to the synchronized reference signal.

Referring to FIG. 4, the multi-channel connector 300 includes a demultiplexer 310 that wavelength-divides an optical pulse based on wavelength division multiplexing (WDM), a multi-channel path 330 through which a plurality of wavelength-divided optical sub-pulses pass, and a multiplexer 350 that multiplexes the optical sub-pulses passed through the channel paths. At least one sensor may be connected to at least one optical fiber of the channel paths 330, and the time-of-flight of the optical sub-pulse passing through the channel path is changed by the sensor. Meanwhile, although the demultiplexer 310 and the multiplexer 350 are separated in the drawing, a wavelength division multiplexer may be implemented to transmit an optical sub-pulse and receive the optical sub-pulse reflected by a mirror (not shown) and the like. Each of the demultiplexer 310 and the multiplexer 350 may be called a transmitter and a receiver.

The demultiplexer 310 divides an optical pulse into wavelengths of each channel in the spectrum domain, and outputs optical sub-pulses of different wavelengths. The multi-channel path 330 is implemented with optical fibers through which a plurality of wavelength-divided optical sub-pulses pass, and the sensor is connected with at least one channel path. The multiplexer 350 multiplexes the optical sub-pulses passed through separate channel paths to transmit them to a single fiber.

For example, a sensor A is connected to a channel path through which an optical sub-pulse A of a wavelength $\lambda a$ passes among a plurality of channel paths, and a sensor B may be connected to a channel path through which an optical sub-pulse B of a wavelength $\lambda b$ passes among the plurality of channel paths. The optical sub-pulse A and the optical sub-pulse B experience different times of flight depending on the sensors connected thereto.

Meanwhile, a channel of a specific wavelength among the plurality of channels may be designated as a reference channel Since no sensor is connected to the reference channel, an optical sub-pulse C passed through the reference channel path does not experience a change in the time-of-flight, so becomes a reference to detect the change in the time-of-flight. Using the timing error detected in the reference channel, the RF signal source 200 can be synchronized to the optical pulse of the pulsed laser 100.

Referring back to FIG. 3, the multi-channel optical phase detector 400 receives an optical signal transmitted from the multi-channel connector 300. The optical signal includes optical sub-pulses where different timing errors ($\Delta\tau1$, $\Delta\tau2$, $\Delta\tau3$) with respect to the reference signal are generated.

The multi-channel optical phase detector 400 detects the timing errors ($\Delta\tau1$, $\Delta\tau2$, $\Delta\tau3$) of each of the optical sub-pulses by using the reference signal of the RF signal source 200. In this case, the multi-channel optical phase detector 400 outputs electrical signals $Ve(\Delta\tau1)$, $Ve(\Delta\tau2)$, $Ve(\Delta\tau3)$ that are proportional to the timing errors by using electro-optic sampling. Variation of the electrical signal with respect to the timing error can be determined before and after synchronization through timing delay tuning of a given range. A slope of a relationship graph can be changed, and the timing error can be detected with higher resolution by increasing the frequency by adjusting the frequency of the RF signal source 200.

The electrical signal corresponding to the timing error for each channel may be output by a balanced photodetector for each channel. The balanced photodetector may include two photodiodes and one differential amplifier. A balanced photodetector outputs an electrical signal which is corresponding to an intensity difference of two optical signals which are entered into the two photodiodes respectively. The two optical signals entered to the two photodiodes of each balanced photodetector are wavelength-divided optical signals guided into the corresponding channels by the demultiplexer.

The multi-channel optical phase detector 400 can be implemented with various techniques for outputting the electrical signal proportional to the timing errors between the reference signal and each of the sub-pulses. For example, the multi-channel optical phase detector 400 may be implemented by using a fiber loop-based optical-microwave phase detector (FLOM-PD) using a Sagnac loop interferometer, a 3×3 coupler-based phase detector, a balanced optical-microwave phase detector (BOM-PD), or a biased Mach-Zehnder interferometer-based phase detector. In the description, an optical loop-based optical-microwave phase detector (FLOM-PD) using an interference of optical pulses circulated in different directions of the optical loop is described as an example, but this is not restrictive.

An electrical signal output from the multi-channel optical phase detector 400 is converted into a measured physical quantity of a sensor of the corresponding channel through real-time signal processing of a computing device operated by a processor (not shown). In this case, a method of measuring a change in optical intensity is suitable for very high speed and high speed measurement because it is possible to measure/convert the physical quantity immediately without additional data processing.

The measured physical quantity is determined by a sensor type. Various sensor heads may be connected, and may be classified into, for example, a strain sensor measuring strain of an optical fiber and a distance measuring sensor measuring flight time of a reflected pulse in free space. A strain sensor may include various types of sensors that can be implemented as FBG-based sensors, sound pressure sensors using a hydrophone, and the like. The distance measuring sensor may include a step of a micrometer scale structure, an absolute distance measurement, a shape measurement using a precision optical scanning device, remote object imaging, a Doppler LiDAR, and the like.

It is natural that the multi-channel sensing system 10 may add apparatuses generally used in optical communication such as an amplifier in consideration of a measurement environment such as signal-to-noise ratio and distance of each channel. The multi-channel sensing system 10 can adjust a reference point for timing detection through a fiber delay line for each channel.

As described, the multi-channel sensing system 10 provides high resolution and a broadband measurement range, and can measure time-of-flight (timing error) of each sensor connected to the multi-channel path all at once. In particular, when the RF signal source 200 is synchronized based on a signal feedbacked from a reference channel designated in the multi-channel sensing system 10, only single optical phase detector may be used to the RF signal source 200 synchronization and timing error detection in multiple channels.

The multi-channel sensing system 10 can operate multiple channels without performance deterioration by using a laser source of an ultrashort optical pulse of less than picoseconds, and can operate more than 10 channels.

Figure 5:
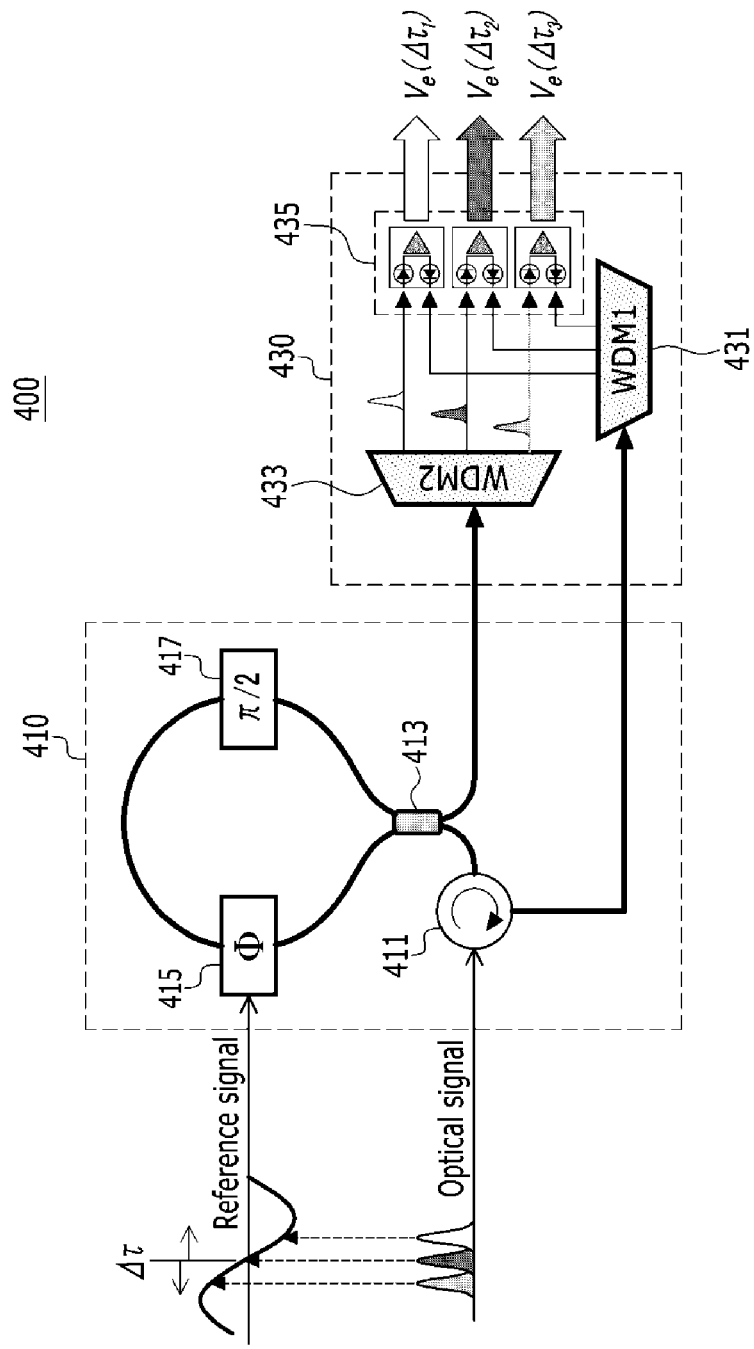
FIG. 5 is a configuration diagram of a multi-channel optical phase detector according to an exemplary embodiment.

FIG. 5 is a configuration diagram of a multi-channel optical phase detector according to an exemplary embodiment.

Referring to FIG. 5, the multi-channel optical phase detector 400 receives an optical signal multiplexed with a plurality of optical sub-pulses from the multi-channel connector 300, and receives a reference signal (a microwave signal) synchronized to the optical pulses from the RF signal source 200. The multi-channel optical phase detector 400 outputs two optical signals related to the timing error (phase error) between the reference signal entered and the optical pulses entered. The multi-channel optical phase detector 400 may wavelength-divide each optical signal into corresponding to the multi-channel by using WDMs. Then the multi-channel optical phase detector 400 outputs a channel-specific electrical signal that corresponds to a channel-specific timing error by using individual balanced photodetection with respect to each channel (wavelength).

The multi-channel optical phase detector 400 includes an error detector 410 and a multi-channel balanced photodetector 430. The error detector 410 receives an optical signal, which is an error detection target, and a reference signal, which is an error detection reference. The error detector 410 outputs two optical signals, which are related to a timing (phase) error of the received optical signal with respect to the reference signal. The error detector 410 may be variously implemented and may be, for example, an optical loop-based optical-microwave phase detector (FLOM-PD) using a Sagnac loop interferometer. The error detector 410 implemented as the optical loop based optical-microwave phase detector (FLOM-PD), may output two interference signals generated through an interference phenomenon of a Sagnac loop interferometer. An intensity difference of the two interference signals may be corresponding to the timing error. Thereafter, the balanced photodetector 430 detects the intensity differences of multi-channels and outputs a channel-specific electrical signal that is proportional to the channel-specific timing error between the channel-specific sub-pulse and the reference signal.

The error detector 410 implemented as the FLOM-PD may include a circulator 411, a coupler 413 implemented in the loop, a phase modulator 415, and a quadrature bias ($\pi/2$) unit 417. The multi-channel balanced photodetector 430 includes a first direction demultiplexer 431, a second direction demultiplexer 433, and a plurality of balanced photodetectors.

An optical signal input from the multi-channel connector 300 passes through the circulator 411 and then reaches the coupler 413. The coupler 413 generates two optical pulses by dividing the optical power in half and transmits the divided optical pulses in different directions of the loop.

Clockwise direction pulses are input to the phase modulator 415. The phase modulator 415 receives a clockwise direction pulse and a reference signal (a microwave signal), and modulates the phase of the clockwise direction pulse in proportion to a voltage of the reference signal. Meanwhile, the phase modulator 415 may maintain the phase of the anti-clockwise direction pulse to be unmodulated.

The clockwise and counterclockwise direction pulses may have a phase difference of $\pi/2$ over the quadrature bias 417.

Each of the counterclockwise direction pulses and the clockwise direction optical pulses are combined in the coupler 413 after circulating through the loop, where interference occurs. The coupler 413 separates the combined optical signal into two output ports signals which are a first direction optical signal and a second direction optical signal.

A timing error may be converted into an optical intensity difference by using an interference occurred when the counterclockwise direction pulse and the clockwise direction optical pulse are combined in the coupler 413. The first direction optical signal is input to the first direction demultiplexer 431. The second direction optical signal passes through the circulator 411 and is then input to the second direction demultiplexer 433.

Each of the first direction demultiplexer 431 and the second direction demultiplexer 433 divides the input optical signal into multi-channels corresponding to channel-specific wavelength. The optical signals of each channel divided by the first direction demultiplexer 431 and the second direction demultiplexer 433 are input to a balanced photodetector of the corresponding channel among a plurality of balanced photodetectors 435-1, 435-2, . . . , and 435-*n*. The balanced photodetector receives optical signals of the corresponding channel divided by the first direction demultiplexer 431 and the second direction demultiplexer 433 through two photodiodes. The balanced photodetector detects an intensity difference of the two optical signal entered to the two photodiodes, and generates an electrical (voltage) signal corresponding to the intensity difference.

As such, the error detector 410 outputs error information (the difference of optical signal intensity) of the optical signal multiplexed with a plurality of optical sub-pulses and the reference signal, and each balanced photodetector 435 outputs an electrical signal corresponding to error information of each channel. The electrical signal may be proportional to the intensity of the reference signal at the point corresponding to the timing error from the zero crossing of the reference signal.

Figure 6:
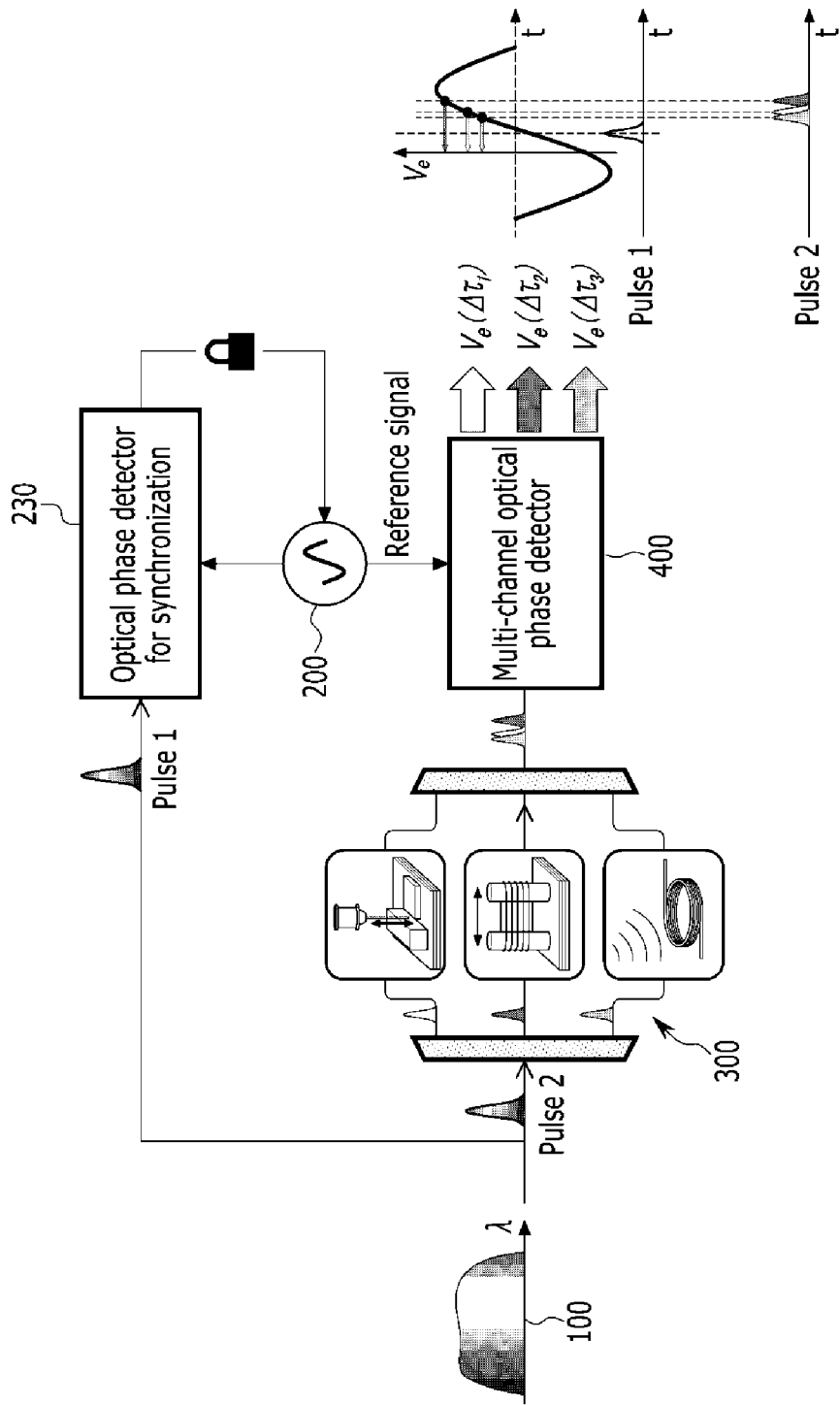
FIG. 6 and FIG. 7 are respectively provided for description of synchronization of the pulsed laser and the RF signal source according to the exemplary embodiment.
Figure 7:
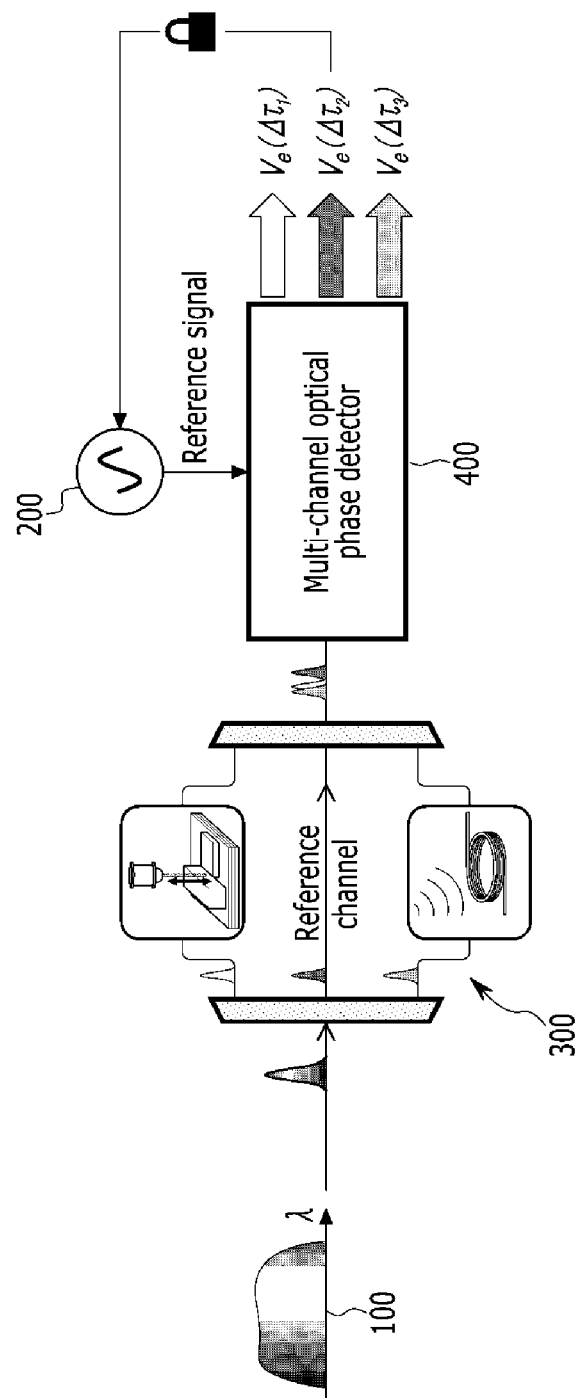

FIG. 6 and FIG. 7 are respectively provided for description of synchronization of the pulsed laser and the RF signal source according to the exemplary embodiment.

Referring to FIG. 6, the multi-channel sensing system 10 may further include an optical phase detector for synchronization 230, which is referred to as a synchronization phase detector.

The synchronization optical phase detector 230 receives optical pulses (Pulse 1) for synchronization and a microwave signal of the RF signal source 200. The synchronization phase detector 230 calculates a timing (phase) error between the microwave signal of the RF signal source 200 and the synchronization optical pulses (Pulse 1). The synchronization phase detector 230 send a feedback signal related to the timing (phase) error to the RF signal source 200. The RF signal source 200 may compensate the timing (phase) error based on the feedback signal. Through this, the RF signal source outputs a reference signal synchronized to the optical pulses of the pulsed laser 100. That is, the RF signal source 200 is phase-located by the synchronization optical pulses (Pulse 1).

The multi-channel optical phase detector 400 outputs an electrical signal (Ve) corresponding to a timing error of each channel based on the reference signal of the RF signal source 200 synchronized by the synchronization optical phase detector 230.

Referring to FIG. 7, the multi-channel optical phase detector 400 calculates the timing error between an optical sub-pulse transmitted in the reference channel and a microwave signal generated from the RF signal source 200. The multi-channel optical phase detector 400 sends a feedback signal that is used to compensate the timing error calculated in the reference channel, to the RF signal source 200.

It is assumed that the multi-channel sensor connector 300 wavelength-divides an optical pulse to several sub-pulses corresponding to channel 1, channel 2, and channel 3. Here, it is assumed that a path of the channel 2 is a reference channel through which an optical sub-pulse 2 divided by the wavelength 2 passes, a path of the channel 1 is a path through which the optical sub-pulse 1 divided by the wavelength 1 passes a sensor A, and a path of the channel 3 is a path through which the optical sub-pulse 3 divided by the wavelength 3 passes a sensor B.

Since the optical sub-pulse 2 passing through the path of the channel 2 does not experience a change in time-of-flight by the sensor, the output $Ve(\Delta\tau2)$ corresponding to the channel 2 may be feedbacked to the RF signal source 200 and be used to synchronize to the pulsed laser 100. The RF signal source 200 synchronized may generate the reference signal.

Each of the optical sub-pulse 1 passed through the path of the channel 1 and the optical sub-pulse 3 passed through the path of the channel 3 experiences a change in time-of-flight by the sensor, and timing errors $\Delta\tau1$ and $\Delta\tau3$ are detected from zero crossing of the reference signal. Thus, a balanced photodetector 435-1 of the channel 1 outputs an electrical signal $Ve(\Delta\tau1)$ that is proportional to the timing error $\Delta\tau1$, and a balanced photodetector 435-2 of the channel 3 outputs an electrical signal $Ve(\Delta\tau3)$ that is proportional to the timing error $\Delta\tau3$.

Figure 8:
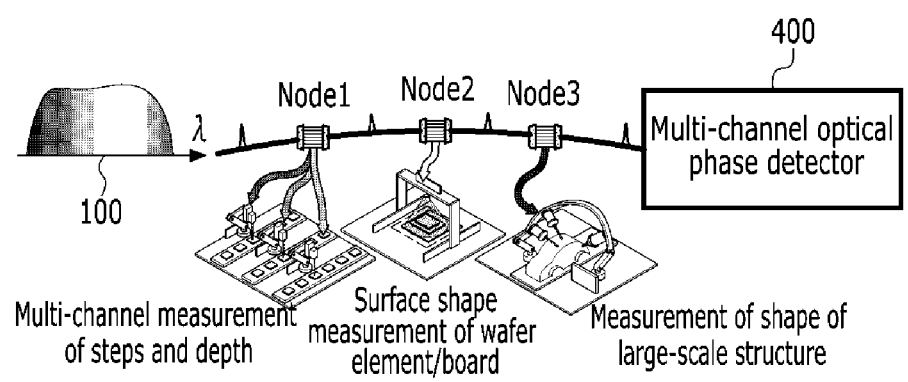
FIG. 8 is provided for description of the multi-channel sensing system including the plurality of multi-channel sensor connectors according to the exemplary embodiment.

FIG. 8 is provided for description of the multi-channel sensing system including the plurality of multi-channel sensor connectors according to the exemplary embodiment.

Referring to FIG. 8, a multi-channel connector 300 may be disposed in each node.

A multi-channel connector 300 of each node includes a plurality of channel paths to which a plurality of sensors can be connected, and sensors may be connected in parallel in each of the plurality of channel paths. There are various types of sensors, for example, sensors for measuring distances and speeds, sensors for measuring surface shapes and three-dimensional structures, sensors for measuring steps and surface roughness, sensors for measuring sound pressure and vibration, and sensors for measuring stress or strain. In addition, it is natural that the same type of sensor can be connected to a plurality of channels so as to simultaneously measure the physical quantity of a product produced on a plurality of production lines.

Multi-channel connectors installed on a plurality of nodes can connect sensors to unused channels of a plurality of channels. The optical pulse output from the pulsed laser 100 is input to the multi-channel optical phase detector 400 after passing through the plurality of nodes.

The multi-channel optical phase detector 400 measures an optical intensity difference corresponding to a timing (phase) error that occurs in each channel, such that physical quantity measurement and conversion can be promptly carried out without additional data processing.

Therefore, the multi-channel sensing system 10 is suitable for a field of measurement requiring very high speed and high speed measurement, and can be usefully used in a large scale measurement system because it can measure various physical quantities at once. The multi-channel sensing system 10 may be usefully used in a field (for example, disaster safety or defense) of making decisions by combining various physical quantities measured remotely.

Figure 9:
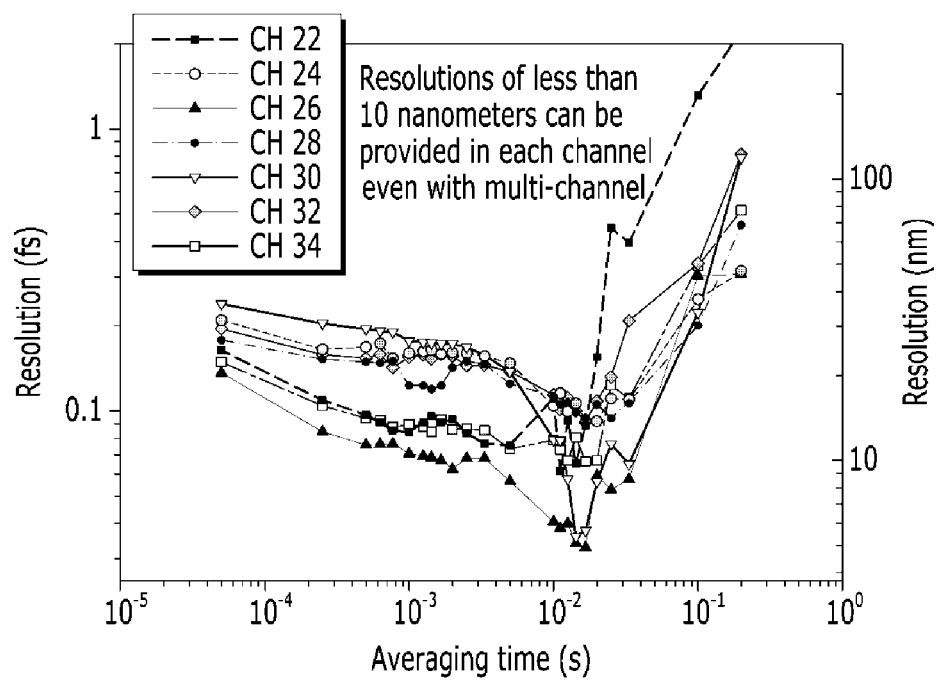
FIG. 9 is a graph illustrating performance of the multi-channel sensing system according to the exemplary embodiment.

FIG. 9 is a graph illustrating performance of the multi-channel sensing system according to the exemplary embodiment.

Referring to FIG. 9, a result of comparison of resolutions measured in seven wavelength-divided channels ch 22, ch 24, ch 26, ch 28, ch 30, ch 32, and ch 34 is shown.

Through this graph, it shows that the multi-channel sensing system 10 can provide resolutions of less than 10 nanometers in each channel, even with wavelength-divided optical sub-pulses.

Figure 10:
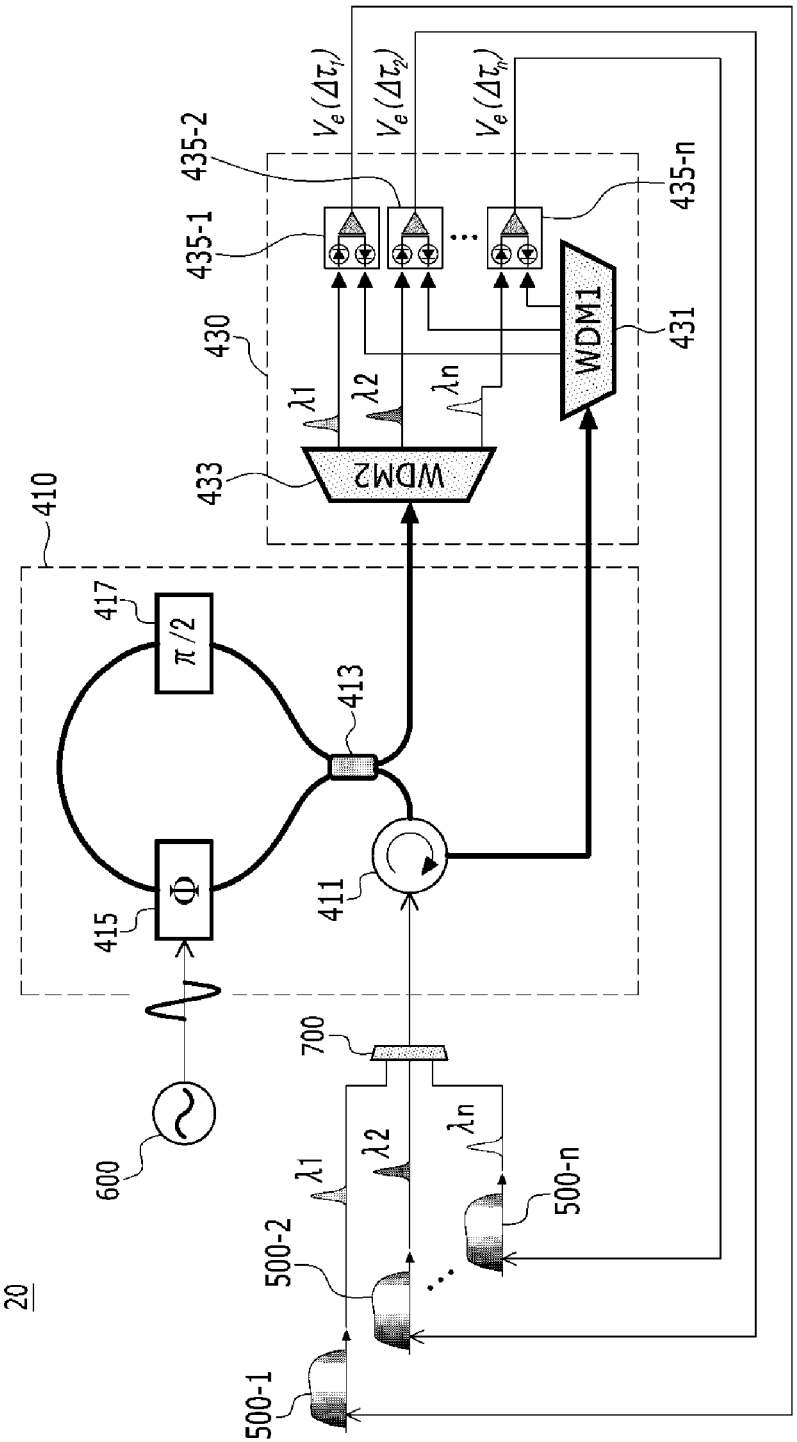
FIG. 10 is a schematic structure diagram of a multi-laser synchronization system using a multi-channel optical phase detector according to another exemplary embodiment.

FIG. 10 is a schematic structure diagram of a multi-laser synchronization system using a multi-channel optical phase detector according to another exemplary embodiment.

Referring to FIG. 10, a multi-channel optical phase detector 400 may synchronize a plurality of lasers 500-1, 500-2, . . . , 500-$n$ as well as the time-of-flight detention.

Conventional multi-laser synchronization systems require separate phase detectors for each laser to compare the phase of each laser with a microwave signal. Therefore, a large system such as an accelerator facility using several laser systems has a drawback in which a plurality of phase detectors are added which greatly increases the volume and cost. On the other hand, according to the present disclosure, one multi-channel optical phase detector 400 can synchronize the plurality of lasers 500-1, 500-2, . . . , 500-$n$ to an RF signal source 600.

A multiple laser synchronization system 20 includes the multi-channel optical phase detector 400, the plurality of lasers 500-1, 500-2, . . . , 500-$n$, the RF signal source 600, and a WDM multiplexer 700.

The plurality of lasers 500-1, 500-2, . . . , 500-$n$ respectively output optical sub-pulses with different wavelengths $\lambda1, \lambda2, \ldots \lambda n$. Channels corresponding the different wavelengths or different frequencies may be allocated for each laser. Each of a plurality of lasers (500-1, 500-2, . . . , 500-$n$) filters (extracts) an optical sub-pulse having a specific wavelength designated to each of the plurality of lasers, transmits the optical sub-pulse extracted to the WDM multiplexer 700.

Optical sub-pulses of different wavelengths are integrated (multiplexed) in the WDM multiplexer 700.

The multiplexed optical signal from the WDM multiplexer 700 is input to the multi-channel optical phase detector 400. The multi-channel optical phase detector 400 may be implemented in various forms for balanced photo-detection of an output signal that corresponds to a timing (phase) error, and as previously described with reference to FIG. 5, it may be implemented as an optical loop-based optical-microwave phase detector (FLOM-PD) using a Sagnac loop interferometer.

The multi-channel optical phase detector 400 may operate as described with reference to FIG. 5. An input optical signal reaches a coupler 413 after passing through a circulator 411. The coupler 413 divides power of an optical pulse into half and generates two optical pulses, and then transmits them in different directions of a loop. A clockwise direction pulse is input to a phase modulator 415. The phase modulator 415 receives a clockwise direction pulse and a reference signal (a microwave signal), and modulates the phase of the clockwise direction pulse in proportion to a voltage of the reference signal. On the other hand, the phase modulator 415 maintains the phase of the counterclockwise direction pulse to be unmodulated.

The clockwise direction pulse output from the phase modulator 415 is input to a quadrature bias 417. Clockwise and counterclockwise direction pulses have a phase difference of $\pi/2$ over a quarter-wave bias 417.

Each of the counterclockwise direction pulses and the clockwise direction optical pulses are combined in the coupler 413 after circulating a loop, and are then separated into a first direction optical signal and a second direction optical signal and input to a first direction demultiplexer 431 and a second direction demultiplexer 433.

Each of the first direction demultiplexer 431 and the second direction demultiplexer 433 divides the input optical signal into multi-channels corresponding to channel-specific wavelengths. An optical signal of each channel divided in the first direction demultiplexer 431 and the second direction demultiplexer 433 is input to a balanced photodetector of the corresponding channel (laser) among a plurality of balanced photodetectors 435-1, 435-2, . . . , 435-n.

A balanced photodetector 435 corresponding to each laser 500 calculates an electrical signal Ve that is proportional to a timing (phase) error of an optical pulse of the corresponding laser and the RF signal source 600. In addition, the output electrical signal corresponding to each laser is fedback to the corresponding laser. Then, each of the plurality of lasers 500-1, 500-2, . . . , 500-n is synchronized to the RF signal source by compensating a timing (phase) error with a reference signal based on the feedback signal.

As described, the multi-channel optical phase detector 400 may synchronize the plurality of lasers 500-1, 500-2, . . . , 500-n to one reference signal (the microwave signal). Thus, multiple lasers with different repetition rates, spectrum, and performance can be synchronized to single reference signal through the multi-channel optical phase detector 400.

As described, according to the exemplary embodiments, wavelength division can be used to generate multi-channel paths and a time-of-flight error (timing error) of each sensor connected to each channel path can be measured at once. According to the exemplary embodiments, the reference signal can be synchronized based on a timing error of an optical sub-pulse transmitted in a specific channel, so that a single optical phase detector can perform not only reference signal synchronization but also multi-channel timing error detection. According to the exemplary embodiments, the ultra-short laser light source of less than picoseconds can be used to perform multi-channel measurement without performance deterioration, and to provide high resolution and a wide measurement range.

In addition, according to the exemplary embodiments, a plurality of lasers can be simultaneously synchronized to one reference signal by using a multi-channel optical phase detector.

The embodiments of the present disclosure described above are not implemented only by the device and method, and may be implemented using a program for realizing a function corresponding to the configuration of the embodiment of the present disclosure or a recording medium storing the program.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A multi-channel sensing system comprising:
a multi-channel sensor connector that wavelength-divides an optical pulse output from a pulsed laser into a plurality of channels in a spectrum domain, transmits each of a plurality of optical sub-pulses generated from the wavelength division to a channel path allocated for each channel in multi-channel paths, multiplexes the plurality of optical sub-pulses passed through the multi-channel paths and outputs an optical signal including the multiplexed optical sub-pulses; and
a multi-channel optical phase detector that receives the optical signal output from the multi-channel sensor connector and a reference signal which is synchronized to the pulsed laser, and detects a channel-specific electrical signal that corresponds to a timing error between each of the plurality of optical sub-pulses included in the optical signal and the reference signal,
wherein a plurality of sensors are connected to the multi-channel paths.

2. The multi-channel sensing system of claim 1, wherein the multi-channel sensor connector comprises:
a demultiplexer that generates the plurality of sub-pulses corresponding to the plurality of channels from the optical pulse output from the pulsed laser based on wavelength division multiplexing;
the multi-channel paths through which the plurality of sub-pulses pass; and
a multiplexer that multiplexes the plurality of optical sub-pulses passed through the multi-channel paths.

3. The multi-channel sensing system of claim 1, wherein the multi-channel optical phase detector comprises:
an error detector that receives the optical signal including the multiplexed plurality of optical sub-pulses, and outputs a first optical signal and a second optical signal that include timing error information between the optical signal received and the reference signal;
a first demultiplexer that wavelength-divides the first optical signal into the plurality of channels;
a second demultiplexer that wavelength-divides the second optical signal into the plurality of channels; and
a plurality of balanced photodetectors that respectively correspond to the plurality of channels, and
wherein each of the balanced photodetectors receives two optical signals output from each channel of the first demultiplexer and the second demultiplexer, and outputs an electrical signal that corresponds to an intensity difference between the two optical signals.

4. The multi-channel sensing system of claim 3, wherein the error detector is implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

5. The multi-channel sensing system of claim 1, wherein the multi-channel optical phase detector transmits an electrical signal detected in a reference channel among the detected channel-specific electrical signals to an RF signal source, as a synchronization signal of the RF signal source, and
wherein the RF signal source compensates an error with respect to the pulsed laser based on the synchronization signal fed back from the multi-channel optical phase detector, and outputs the reference signal synchronized to the pulsed laser.

6. The multi-channel sensing system of claim 1, further comprising:
an RF signal source that outputs a microwave signal; and
an optical phase detector for synchronization that detects an electrical signal corresponding to an error between another optical pulses output from the pulsed laser and the microwave signal, and transmits the detected electrical signal to the RF signal source, as a synchronization signal of the RF signal source, wherein the RF signal source compensates an error with respect to the pulsed laser based on the synchronization signal fed back from the optical phase detector for synchronization, and outputs the reference signal synchronized to the pulsed laser.

7. The multi-channel sensing system of claim 1, wherein a plurality of sensors are connected in parallel on the multi-channel paths, and a channel-specific electrical signal is converted into a measured physical quantity of a corresponding sensor connected to the corresponding channel path.

8. The multi-channel sensing system of claim 1, wherein the multi-channel optical phase detector is disposed in a plurality of nodes on an optical fiber that connects the pulsed laser and the multi-channel optical phase detector, and wherein the multi-channel optical phase detector receives an optical signal including a plurality of optical sub-pulses passed through the plurality of nodes.

9. A multi-laser synchronization system comprising:
an RF signal source that generates a reference signal;
a multiplexer that receives a plurality of optical sub-pulses with different wavelengths designated to a plurality of lasers, wherein the plurality of optical sub-pulses are individually extracted from the plurality of lasers according to designated wavelengths, multiplexes the plurality of optical sub-pulses and outputs an optical signal including the multiplexed optical sub-pulses; and
a multi-channel optical phase detector that receives the optical signal output from the multiplexer and the reference signal, detects an electrical signal for each laser corresponding to a timing error between each of the plurality of optical sub-pulses and the reference signal, and transmits the detected electrical signal for each laser to the corresponding laser for compensating the timing error of the corresponding laser.

10. The multi-laser synchronization system of claim 9, wherein the multi-channel optical phase detector comprises:
an error detector that receives the optical signal including the multiplexed plurality of optical sub-pulses, and outputs a first optical signal and a second optical signal including timing error information between the optical signal received and the reference signal;
a first demultiplexer that wavelength-divides the first optical signal into a plurality of channels respectively designated to the plurality of lasers;
a second demultiplexer that wavelength-divides the second optical signal into the plurality of channels; and
a plurality of balanced photodetectors that output a timing error of each of the plurality of lasers as an electrical signal, and
wherein each of the balanced photodetector receives two optical signals output from each channel of the first demultiplexer and the second demultiplexer, and outputs an electrical signal that corresponds to an intensity difference between two optical signals.

11. The multi-laser synchronization system of claim 10, wherein the error detector is implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

12. A multi-channel sensing system comprising:
an RF signal source that generates a reference signal;
an error detector that receives an optical signal including multiplexed optical sub-pulses with different wavelengths, and outputs a first optical signal and a second optical signal including timing error information between the optical signal received and the reference signal;
a first demultiplexer that wavelength-divides the first optical signal into a plurality of channels;
a second demultiplexer that wavelength-divides the second optical signal into the plurality of channels; and
a plurality of balanced photodetectors that respectively correspond to the plurality of channels, receive two optical signals output for each channel from each of the first demultiplexer and the second demultiplexer, and output electrical signals respectively that correspond to intensity differences of the two optical signals received in each channel.

13. The multi-channel sensing system of claim 12, further comprising a multi-channel sensor connector that generates the optical sub-pulses by wavelength-dividing an optical pulse output from a pulsed laser into the plurality of channels, transmits the optical sub-pulses to channel paths allocated for each channel in multi-channel paths, multiplexes the plurality of optical sub-pulses passed through the multi-channel paths and outputs the optical signal including the multiplexed optical sub-pulses,
wherein the optical signal output from the multi-channel sensor connector is transmitted to the error detector, and
wherein at least one of sensors is connected to at least one of the multi-channel paths.

14. The multi-channel sensing system of claim 13, wherein an electrical signal output from each of the balanced photodetector corresponds to time-of-flight of an optical sub-pulse corresponding channel.

15. The multi-channel sensing system of claim 12, further comprising a multiplexer that receives the optical sub-pulses with different wavelengths designated to a plurality of lasers, wherein the optical sub-pulses are individually extracted from the plurality of lasers according to designated wavelengths, multiplexes the optical sub-pulses and outputs the optical signal multiplexed with optical sub-pulses,
wherein the optical signal from the multiplexer is transmitted to the error detector.

16. The multi-channel sensing system of claim 15, wherein an electrical signal output from each of the balanced photodetectors is transmitted to a corresponding laser, and
wherein each of the plurality of lasers compensates an error with the RF signal source based on the electrical signal fed back from the corresponding balanced photodetector, and outputs optical pulses synchronized to the RF signal source.

* * * * *